United States Patent
Krinsky

(10) Patent No.: US 10,182,022 B2
(45) Date of Patent: *Jan. 15, 2019

(54) DYNAMIC JITTER BUFFER SIZE ADJUSTMENT

(71) Applicant: AT&T MOBILITY II LLC, Atlanta, GA (US)

(72) Inventor: Jeffrey Krinsky, Woodinville, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/454,052

(22) Filed: Mar. 9, 2017

(65) Prior Publication Data

US 2017/0180275 A1 Jun. 22, 2017

Related U.S. Application Data

(63) Continuation of application No. 14/838,792, filed on Aug. 28, 2015, now Pat. No. 9,634,947.

(51) Int. Cl.
*H04L 12/861* (2013.01)
*H04L 12/841* (2013.01)
(Continued)

(52) U.S. Cl.
CPC ....... *H04L 49/9005* (2013.01); *H04B 17/309* (2015.01); *H04L 1/205* (2013.01);
(Continued)

(58) Field of Classification Search
None
See application file for complete search history.

(56) References Cited

U.S. PATENT DOCUMENTS

| 6,452,950 B1 | 9/2002 | Ohlsson et al. |
| 6,684,273 B2 | 1/2004 | Boulandet et al. |

(Continued)

FOREIGN PATENT DOCUMENTS

EP    1838066 A2    9/2007

OTHER PUBLICATIONS

McNeill, K., "An Adaptive Jitter Buffer Play-Out Scheme to Improve VOIP Quality in Wireless Networks", Military Communications Conference, Oct. 23-25, 2006, IEEE, pp. 1-5.

(Continued)

*Primary Examiner* — Rebecca E Song
(74) *Attorney, Agent, or Firm* — Toler Law Group, PC

(57) ABSTRACT

In a particular implementation, a method includes dynamically adjusting a size of a buffer of a receiving terminal based on a comparison of a signal quality metric associated with a wireless communication channel between the receiving terminal and a transmitting terminal to a signal quality threshold. The method also includes storing a first set of data packets of a plurality of data packets in the buffer. The first set of data packets are received at the receiving terminal from the transmitting terminal. The method further includes outputting reconstructed speech based on the first set of data packets and replacement packets that are generated based at least in part on the first set of data packets. The replacement packets are associated with a set of unreceived data packets of the plurality of data packets.

17 Claims, 3 Drawing Sheets

(51) Int. Cl.
*H04L 12/26* (2006.01)
*H04L 1/20* (2006.01)
*H04B 17/309* (2015.01)
*H04W 4/029* (2018.01)
*H04W 28/02* (2009.01)

(52) U.S. Cl.
CPC .......... *H04L 43/04* (2013.01); *H04L 43/087* (2013.01); *H04L 43/0829* (2013.01); *H04L 43/16* (2013.01); *H04L 47/283* (2013.01); *H04W 4/029* (2018.02); *H04W 28/0226* (2013.01)

(56) References Cited

U.S. PATENT DOCUMENTS

| | | |
|---|---|---|
| 6,747,999 B1 | 6/2004 | Grosberg et al. |
| 7,027,456 B1 | 4/2006 | Chen |
| 7,359,324 B1 | 4/2008 | Ouellette et al. |
| 7,542,422 B2 | 6/2009 | Joyce et al. |
| 7,599,399 B1 | 10/2009 | Bugenhagen |
| 7,680,153 B2 | 3/2010 | Ma |
| 8,213,444 B1 | 7/2012 | Harris et al. |
| 8,218,579 B2 | 7/2012 | Liu et al. |
| 8,472,320 B2 | 6/2013 | Enstrom et al. |
| 8,619,642 B2 | 12/2013 | Shaffer et al. |
| 8,645,741 B2 | 2/2014 | Vonog et al. |
| 8,693,355 B2 | 4/2014 | Lundsgaard |
| 8,848,525 B2 | 9/2014 | Li |
| 8,855,145 B2 | 10/2014 | Vafin et al. |
| 8,976,675 B2 | 3/2015 | Michaelis |
| 2005/0174974 A1 | 8/2005 | Sonntag et al. |
| 2005/0180323 A1* | 8/2005 | Beightol .......... H04L 29/06027 370/230 |
| 2006/0077994 A1* | 4/2006 | Spindola .............. H04J 3/0632 370/412 |
| 2007/0019931 A1 | 1/2007 | Sirbu |
| 2007/0280245 A1 | 12/2007 | Rosberg |
| 2011/0002269 A1 | 1/2011 | Ranta-Aho et al. |
| 2012/0009892 A1* | 1/2012 | Yen ..................... H04B 1/1027 455/334 |
| 2013/0100970 A1* | 4/2013 | Vafin ............... H04N 21/44004 370/517 |
| 2013/0114448 A1 | 5/2013 | Koo |
| 2014/0269326 A1 | 9/2014 | Westin et al. |
| 2015/0110134 A1 | 4/2015 | Kozica et al. |
| 2016/0029224 A1 | 1/2016 | Edge |
| 2016/0057639 A1 | 2/2016 | Smith |
| 2016/0105473 A1 | 4/2016 | Klingbeil et al. |
| 2016/0282129 A1 | 9/2016 | Wang et al. |

OTHER PUBLICATIONS

Sun, L. et al., "Prediction of perceived conversational speech quality and effects of playout buffer algorithms", IEEE International Conference on Communications, May 11-15, 2003, vol. 1, pp. 1-6.

Liu, J., et al., "An adaptive receiver buffer adjust algorithm for VoIP applications considering voice characters", The Joint Conf. of the 10th AsiaPacific Conf. on Comm. and the 5th Intl. Symposium on Multi-Dimensional Mobile Communications, Aug. 29-Sep. 1, 2004, vol. 2, pp. 597-601.

Boutremans, C. et al., "Adaptive Joint Playout Buffer and FEC Adjustment for Internet Telephony", Twenty-Second Annual Joint Conference of the IEEE Computer and Communications IEEE Societies, Mar. 30-Apr. 3, 2003, vol. 1, pp. 652-662.

* cited by examiner

DYNAMIC JITTER BUFFER SIZE ADJUSTMENT

PRIORITY CLAIM

This application is a continuation of, and claims priority to, U.S. patent application Ser. No. 14/838,792, filed on Aug. 28, 2015, the contents of which are expressly incorporated herein by reference in its entirety.

FIELD OF THE DISCLOSURE

The present disclosure is generally related to storing data packets in a jitter buffer of a user device.

BACKGROUND

Multimedia content may be delivered from a first user device to a second user device using a wireless network and/or a wired network. Multimedia content may be delivered using packetized transport services. Packetized transport services are being rapidly adopted and are replacing circuit switched services for wireless network communications and wired communications.

However, packetized transport services may introduce disadvantages compared to circuit switched services. For example, the length of time to deliver packets from the first user device to the second user device may vary, packets may arrive out of order, and some packets may be lost during transmission (e.g., some packets may never reach the second user device).

A jitter buffer at a receiving terminal (e.g., the second user device) may be used to reduce jitter and to receive packets that arrive out of order. However, the size of the jitter buffer may impact communication quality. For example, a relatively large jitter buffer may reduce a number of discarded (e.g., lost) packets and may reduce disruptions in service (e.g., video freezing, audio dropouts, etc.). However, a relatively large jitter buffer may also degrade (e.g., increase) latency. On the other hand, a relatively small jitter buffer may improve (e.g., reduce) latency. However, a relatively small jitter buffer may result in increased packet loss (e.g., discontinuous streaming). Thus, a design of the jitter buffer may trade off latency for packet loss. For example, increasing the size of the jitter buffer increases latency and reduces the chance of packet loss due to late packet delivery.

DETAILED DESCRIPTION

Figure 1:
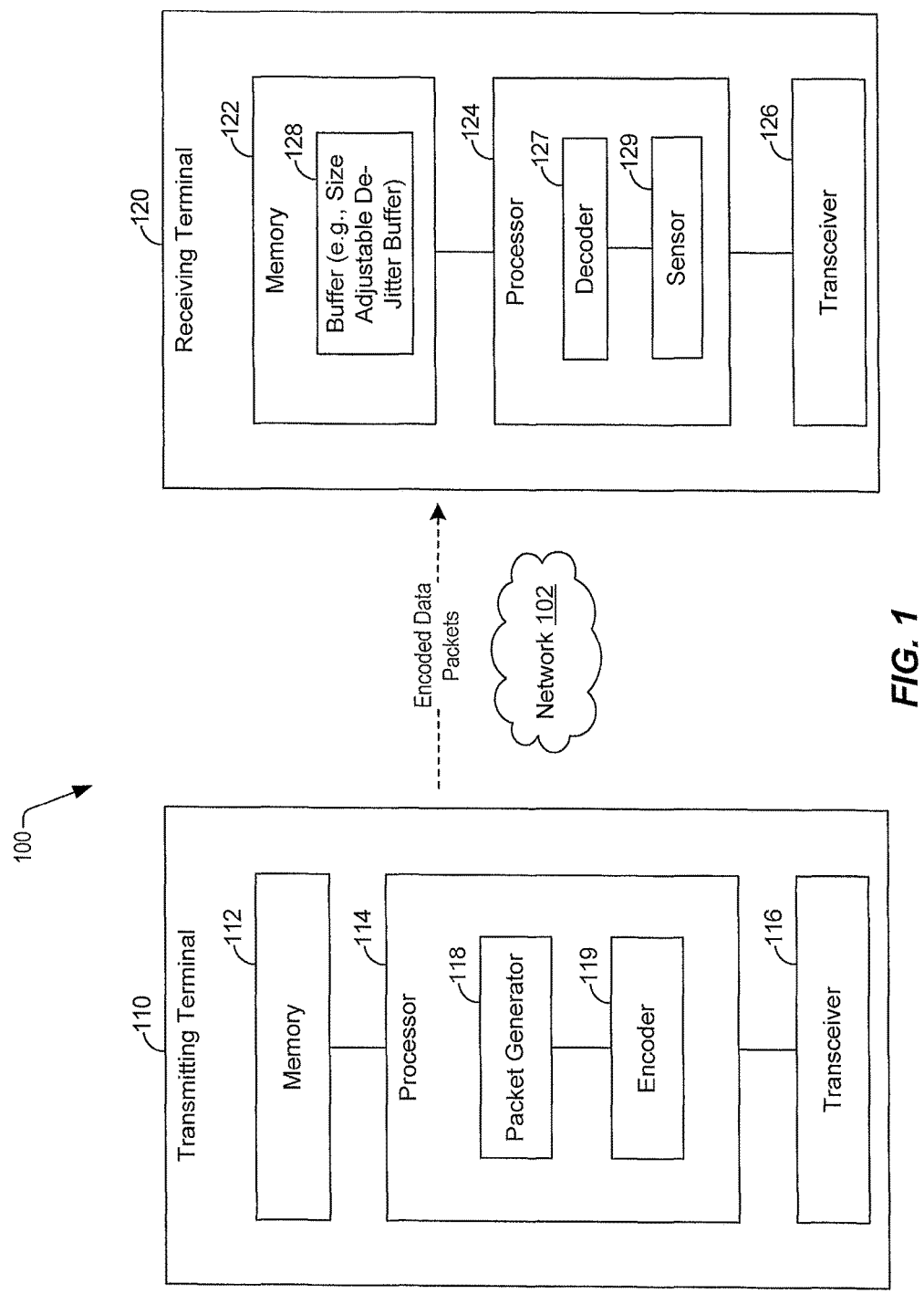
FIG. 1 is a block diagram of a system that supports dynamic jitter buffer size adjustment.

A size (e.g., a depth) of a jitter buffer in a receiving terminal may be dynamically adjusted based on various factors to improve performance (e.g., improve a tradeoff between latency and packet loss). The receiving terminal may receive packetized data from a transmitting terminal and may store the packetized data in the jitter buffer for decoding operations. The receiving terminal may dynamically adjust the size of the jitter buffer based on a variety of factors. As non-limiting examples, the receiving terminal may dynamically adjust the size of the jitter buffer based on a "real-time" dropped packet rate (e.g., a rate of packet loss), a "real-time" latency, one or more environmental factors, a use case application, or a combination thereof.

To illustrate, if the receiving terminal determines that the real-time dropped packet rate is above a packet loss threshold, the receiving terminal may dynamically increase the size of the jitter buffer to reduce the amount of dropped data packets and to reduce the dropped packet rate. If the receiving terminal determines that the real-time latency is above a latency threshold, the receiving terminal may dynamically decrease the size of the jitter buffer to improve latency. If the receiving terminal determines that there is a relatively high amount of environmental noise, path loss, or a combination thereof, near the receiving terminal and/or near the transmitting terminal, the receiving terminal may dynamically increase the size of the jitter buffer. Additionally, the receiving terminal may dynamically increase the size of the jitter buffer for streaming files (e.g., streaming video, streaming audio, etc.) if the receiving terminal predicts that data associated with the streaming files will travel through a region with poor signal quality. As explained with respect to FIG. 1, a coding and modulation scheme (e.g., a Forward Error Correction (FEC) coding and modulation scheme) may also be adjusted to change time slot utilization for purposes of decreasing packet loss.

The factors described above that are used to adjust the size of the jitter buffer are non-limiting examples and should not be construed as limiting. Increasing the size of the jitter buffer may reduce the amount of packet loss (e.g., the amount of dropped packets), which in turn may reduce the amount of disruptions in service. Decreasing the size of the jitter buffer may improve latency. The techniques presented herein may be used to improve performance related to the tradeoff between packet loss and latency based on at least the above-described factors.

In one implementation of the disclosed techniques, a method includes storing data packets in a buffer at a receiving terminal. The data packets are received by the receiving terminal from a transmitting terminal. The method also includes determining a dropped packet rate at the receiving terminal, a packet transmission latency between the receiving terminal and the transmitting terminal, a signal quality at the receiving terminal, and a use application at the receiving terminal. As used herein, a "use application" may include any function or operation performed by the receiving terminal. Non-limiting examples of a use application include interactive calls, streaming video file applications, streaming audio file applications, etc. The method further includes dynamically adjusting a size of the buffer based on the dropped packet rate, based on the packet transmission latency, based on the signal quality, and based on the use application.

In another implementation of the disclosed techniques, an apparatus includes a processor and a memory coupled to the processor. The memory includes instructions executable by the processor to perform operations including storing data packets in a buffer at a receiving terminal. The data packets are received by the receiving terminal from a transmitting terminal. The operations also include determining a dropped packet rate at the receiving terminal, a packet transmission latency between the receiving terminal and the transmitting terminal, a signal quality at the receiving terminal, and a use application at the receiving terminal. The operations further include dynamically adjusting a size of the buffer based on the dropped packet rate, based on the packet transmission latency, based on the signal quality, and based on the use application.

In another implementation of the disclosed techniques, a computer-readable storage device includes instructions that, when executed by a processor within a receiving terminal, cause the processor to perform operations including storing data packets in a buffer at the receiving terminal. The data packets are received by the receiving terminal from a transmitting terminal. The operations also include determining a dropped packet rate at the receiving terminal, a packet transmission latency between the receiving terminal and the transmitting terminal, a signal quality at the receiving terminal, and a use application at the receiving terminal. The operations further include dynamically adjusting a size of the buffer based on the dropped packet rate, based on the packet transmission latency, based on the signal quality, and based on the use application. A non-transitory storage device is a non-limiting example of a "computer-readable storage device".

FIG. 1 is a block diagram of a system 100 that supports dynamic jitter buffer size adjustment. The system 100 includes a transmitting terminal 110 and a receiving terminal 120. The transmitting terminal 110 may be configured to transmit data packets to the receiving terminal 120 via a network 102. Non-limiting examples of the network 102 may include the internet, a private network, or a mobile communication network. The network 102 may be a wireless network, a wired network, a fiber optic cable network, other networks (e.g., a sonic data transfer network, a fess space network, etc.), or a combination thereof. Although the following description is described with respect to a full-duplex point-to-point transmission (e.g., unicast transmission), the following techniques may also be implemented for multicast transmissions, broadcast transmissions, push-to-talk transmissions, etc.

The terminals 110, 120 may include, but are not limited to, one or more media devices (e.g., one or more set-top boxes, one or more residential gateways, one or more media playback devices, or combinations thereof) and one or more output devices (e.g., one or more sound systems, one or more display devices, or combinations thereof), one or more computing systems, one or more portable computing devices (e.g., one or more laptop computers, tablet computers, computerized glasses, personal digital assistants, etc.), one or more mobile communication devices (e.g., a mobile phone, a smart phone, a cellular phone, etc.), other devices, or combinations thereof. The transmitting terminal 110 includes a memory 112, a processor 114, and a transceiver 116. The processor 114 includes a packet generator 118 and an encoder 119. The receiving terminal 120 includes a memory 122, a processor 124, and a transceiver 126. The processor 124 includes a decoder 127 and a sensor 129. The memory 122 includes a buffer 128 (e.g., a size adjustable de jitter buffer). Although the buffer 128 is shown as included in the memory 122, in other implementations, the buffer 128 may be included in the processor 124 or at another location. As described below, a size of the buffer 128 may be adjusted by the processor 124 based on a variety of factors based on a tradeoff between packet loss and latency. As used herein, "adjusting the size of a buffer" may include physically increasing or decreasing the size (e.g., depth) of the buffer, dedicating additional or fewer storage locations in the buffer to store data packets, selecting additional or fewer buffers to store data packets, or a combination thereof.

The packet generator 118 may be configured to generate data packets that are to be sent to the receiving terminal 120 via the network 102. For example, the packet generator 118 may generate N data packets, where N is any integer greater than zero. For ease of description, the remaining portion of the description will assume that the packet generator 118 generates data packets in sequential order. For example, the packet generator 118 generates a first data packet, followed by a second data packet, followed by a third data packet, etc. The data packets generated by the packet generator 118 may include data for one or more services. For example, the data packets may include data for a streaming video service, data for a streaming audio service, data for a short message service, data for an audio call, other services, or a combination thereof.

The encoder 119 may be configured to encode the data packets prior to transmission. For example, the encoder 119 may encode the first data packet to generate a first encoded data packet, encode the second data packet to generate a second encoded data packet, encode the third data packet to generate a third encoded data packet, etc. After generating the encoded data packets, the processor 114 may provide the encoded data packets to the transceiver 116. The transceiver 116 may be configured to transmit each encoded data packet to the receiving terminal 120 via the network 102. The transceiver 116 may transmit the encoded data packets to the receiving terminal 120 in sequential order. For example, the transceiver 116 may transmit the first encoded data packet, followed by the second encoded data packet, followed by the third encoded data packet, etc.

The transceiver 126 of the receiving terminal 120 may be configured to receive the encoded data packets from the transceiver 116 of the transmitting terminal 110. However, due to different network conditions, the encoded data packets may arrive out of order. As a non-limiting example, the transceiver 126 may receive the third encoded data packet prior to receiving the first encoded data packet. In other scenarios, encoded data packets may be lost during transmission. For example, the transceiver 126 may receive the first encoded data packet followed by the third encoded data packet, but the second encoded data packet may be lost during transmission and never received by the transceiver 126. The encoded data packets may arrive out of order (or may be lost during transmission) due to a network delay, a data handling capacity, wireless signal conditions, a network load, etc.

The buffer 128 may store the encoded data packets to reduce jitter and to alleviate drawbacks associated with the encoded data packets that arrive out of order. For example, the buffer 128 may "absorb" or reduce jitter (e.g., due to the delay) in the packet arrival time by buffering the encoded data packets received by the transceiver 126 and providing the encoded data packets to the decoder 127 at regular intervals for decoding. The decoder 127 may retrieve the encoded data packets from the buffer 128 in sequential order. For example, the decoder 127 may retrieve the first encoded data packet for decoding, followed by the second encoded data packet, followed by the third encoded data packet, etc. If a particular encoded data packet is not stored at the buffer 128 at the time the decoder 127 attempts to retrieve the particular encoded data packet, a disruption in service may occur. For example, after the decoder 127 decodes the first encoded data packet, the decoder 127 may attempt to retrieve and decode the second encoded data packet. However, if the second encoded data packet is not in the buffer 128, the second data packet may be considered a "dropped" data packet and a disruption in service may occur.

The number of encoded data packets that may be stored at the buffer 128 may depend on the size of the buffer 128. For example, if the buffer 128 has a relatively large size, the buffer 128 may store a relatively large number of encoded data packets. Storing a relatively large number of encoded data packets at the buffer 128 may compensate for encoded data packets arriving out of order and thus may reduce the amount of disruptions in service. For example, by storing a relatively large number of encoded data packets at the buffer 128, the likelihood that the decoder 127 may fetch and decode consecutive encoded data packets from the buffer 128 is relatively high. As a result, continuous (e.g., uninterrupted) streaming may result from a relatively large buffer 128. As non-limiting examples, a relatively large buffer 128 may reduce the amount of video freezing in a video streaming service due to packets arriving out of order, reduce the amount of audio dropouts in an audio streaming service due to packets arriving out of order, etc. Thus, a relatively large buffer 128 may reduce packet loss and may improve the customer experience. However, a relatively large buffer 128 may also degrade (e.g., increase) latency. For example, a relatively large buffer 128 may result in an increased time period between generation of the packet at the packet generator 118 of the transmitting terminal 110 and decoding of the packet at the decoder 127 of the receiving terminal 120. Increased latency may degrade the customer experience for voice calls. For example, there may be a relatively long delay between when a sound is generated at the transmitting terminal 110 and when the sound is heard at the receiving terminal 120.

The processor 124 may dynamically adjust the size of the buffer 128 based on the tradeoff between packet loss and latency. To illustrate, the processor 124 may be configured to determine a dropped packet rate at the receiving terminal 120. For example, the processor 124 may determine a number of occurrences within a time period that the decoder 127 unsuccessfully attempts to retrieve an encoded data packet from the buffer 128. Additionally, the processor 124 may be configured to determine a packet transmission latency between the receiving terminal 120 and the transmitting terminal 110. As used herein, a "packet transmission latency between a receiving terminal and a transmitting terminal" may include a time interval between packet generation at the transmitting terminal and packet reception at the receiving terminal or packet processing at the receiving terminal. For example, the processor 124 may determine the packet transmission latency by comparing a time stamp of a particular data packet to a time when the particular data packet is decoded at the decoder 127. The time stamp may indicate when the particular data packet was generated by the packet generator 118. According to one implementation, the transmitting terminal 110 and the receiving terminal 120 may be synchronized to a global clock to synchronize the time at the transmitting terminal 110 with the time at the receiving terminal 120.

The processor 124 may be configured to dynamically adjust the size of the buffer 128 based on the dropped packet rate, based on the packet transmission latency, or based on a combination thereof (e.g., a Model Output Statistics (MOS) Isopleth on a two-dimensional chart of dropped packet rate vs. packet transmission latency) based on the tradeoff between packet loss and latency. To illustrate, the processor 124 may increase (e.g., enlarge) the size of the buffer 128 if the dropped packet rate is greater than a first threshold (e.g., a dropped packet threshold). As a non-limiting example, the first threshold may be equal to four (or less) unsuccessful attempts during a two-hundred millisecond time interval. If the decoder 127 unsuccessfully attempts to retrieve more than five encoded data packets from the buffer 128 during a two-hundred millisecond time interval, the processor 124 may increase the size of the buffer 128 to store more encoded data packets. The dropped packet threshold may also correspond to a percentage of data packets that are dropped during communication. As a non-limiting example, a commonly quoted requirement for Voice Over Long-Term Evolution (VoLTE) is that a packet loss of less than one percent is required (although it is to be understood that thresholds other than approximately one percent may be used in alternative examples). Increasing the size of the buffer 128 may enable additional encoded data packets to be stored at the buffer 128, which in turn, may decrease the likelihood of an unsuccessful attempt (e.g., decrease the dropped packet rate).

The processor 124 may decrease the size of the buffer 128 if the packet transmission latency is greater than a second threshold (e.g., a latency threshold). As a non-limiting example, if the packet generator 118 of the transmitting terminal 110 generates a particular data packet at a first time and the decoder 127 decodes the particular data packet at a second time, the processor 124 may determine the packet transmission latency based on a difference between the second time and the first time. If the difference is greater than the second threshold, the processor 124 may decrease the size of the buffer 128 to reduce the amount of data packets stored at the buffer 128, which in turn, may decrease the packet transmission latency. For example, storing fewer data packets at the buffer 128 may reduce buffer congestion, which in turn, may decrease the packet transmission latency.

According to some implementations, the processor 124 may determine the packet transmission latency based on a theoretical end-to-end latency. For example, the processor 124 may estimate the packet transmission latency based on a most probable packet path (e.g., a most likely path that a data packet will use to travel from the transmitting terminal 110 to the receiving terminal 120). According to other implementations, the processor 124 may determine the packet transmission latency based on a calculated end-to-end latency. For example, the processor 124 may calculate the packet transmission latency based on a packet path used in transmitting a data packet from the transmitting terminal 110 to the receiving terminal 120. According to other implementations, the processor 124 may determine the packet transmission latency based on a measured end-to-end latency. The measured end-to-end latency may correspond to periodic (or near real-time) time measurements between packet generation at the packet generator 118 and packet decoding at the decoder 127. For example, the difference between the time indicated on the time stamp during data packet generation and the time when the data packet is decoded may correspond to the measured end-to-end latency.

The processor 124 may also consider other factors in dynamically adjusting the size of the buffer 128. For example, the processor 124 may dynamically adjust the size of the buffer 128 based on a signal quality at the receiving terminal 120. To illustrate, the sensor 129 may determine (e.g., measure) the signal quality at the receiving terminal 120. According to one implementation, the signal quality may be compared to a third threshold (e.g., a signal quality threshold). The processor 124 may increase the size of the buffer 128 if the signal quality is below the third threshold. For example, if the signal quality is below the third threshold, data packets may arrive out of order due to network conditions. Thus, an increased amount of encoded data packets may need to be stored at the buffer 128 to increase the likelihood that an encoded data packet that arrived out of order is accessible to the decoder 127 when the decoder 127 attempts to retrieve the encoded data packet. Thus, the processor 124 may increase the size of the buffer 128 to store the increased amount encoded data packets.

According to some implementations, the processor 124 may also dynamically adjust the size of the buffer 128 based on a signal quality at the transmitting terminal 110. To illustrate, the transmitting terminal 110 may send a message to the receiving terminal 120 indicating a measured signal quality at the transmitting terminal 110. If the measured signal quality at the transmitting terminal 110 is below a threshold, the processor 124 may increase the size of the buffer 128.

The processor 124 may also dynamically adjust the size of the buffer 128 based on audio noise at the transmitting terminal 110, audio noise at the receiving terminal 120, or a combination thereof. To illustrate, if the sensor 129 detects a relatively high amount of noise at the receiving terminal 120, the processor 124 may dynamically increase the size of the buffer 128. If the sensor 129 detects a relatively low amount of noise at the receiving terminal 120, the processor 124 may dynamically decrease the size of the buffer 128. According to some implementations, the transmitting terminal 110 may send a message to the receiving terminal 120 indicating a detected amount of noise at the transmitting terminal 110. If the detected amount of noise at the transmitting terminal 110 is relatively high, the processor 124 may dynamically increase the size of the buffer 128. If the detected amount of noise at the transmitting terminal 110 is relatively low, the processor 124 may dynamically decrease the size of the buffer 128.

According to some implementations, the processor 124 may also dynamically adjust the size of the buffer 128 based on Model Output Statistics (MOS) degradation and/or speech intelligibility degradation due to transcoding. Speech intelligibility degradation may be due to packet loss. Thus, if the processor 124 determines that speech is degraded at the receiving terminal 120, the processor 124 may increase the size of the buffer 128 to store a greater number of data packets.

According to some implementations, the processor 124 may dynamically adjust the size of the buffer 128 based on the use application. For example, the processor 124 may dynamically increase the size of the buffer 128 for interactive calls in anticipation of increased latency. Similarly, the processor 124 may dynamically increase the size of the buffer 128 for streaming files (e.g., streaming video, streaming audio, etc.) if the processor 124 predicts (based on data from the sensor 129) that the receiving terminal 120 will travel through a region with poor signal quality (e.g., poor radio frequency (RF) conditions) or predicts that the receiving terminal 120 is subject to cell handover. For example, if the receiving terminal 120 travels through a region of poor signal quality or is subject to cell handover, the rate at which the receiving terminal 120 receives data packets may decrease. To compensate for the reduced rate, a larger buffer 128 may be used to store a greater number of data packets when the receiving terminal 120 is in a region having a strong signal quality. Thus, when the receiving terminal 120 enters into the region of poor signal quality (or experiences cell handover), the increased number of data packets (stored in the buffer 128 when the receiving terminal 120 was in the region having the strong signal quality) may be used to enable continuous decoding of data packets during the time period associated with the reduced packet reception rate.

According to some implementations, the processor 124 may dynamically adjust the size of the buffer 128 based on a location of the receiving terminal 120. As described above, if the processor 124 determines that the location corresponds to a region of poor signal quality, the processor 124 may dynamically increase the size of the buffer 128. The processor 124 may determine the location of the receiving terminal 120 based on a global positioning system (GPS), inertial navigation, or other techniques.

In some implementations, the processor 124 may predict a future location (or path of travel) of the receiving terminal 120 and dynamically adjust the size of the buffer 128 based on the predicted future location/path or based on predicted radio frequency conditions. According to one example, the predicted future location/path may be based on user input. To illustrate, the user of the receiving terminal 120 may input a destination address into a user interface and the processor 124 may predict future locations/paths by accessing a turn-by-turn navigation system designated to instruct the user on how to arrive at the destination address. As another example, the processor 124 may predict a future location/path based on previous user behavior. To illustrate, if a user of the receiving terminal 120 drives along a particular route to work on week days, the processor 124 may predict the future location/path of the receiving terminal 120 based on the particular route. As another example, the processor 124 may access a schedule in the memory 122 that includes locations and times of various meeting/activities of the user of the receiving terminal 120. Based on the locations/times in the schedule, the processor 124 may predict the future location/path of the receiving terminal 120. Additionally, a historical database may store information indicating "optimal" or preferred jitter buffer sizes for different locations (or predictive locations) based on content, end user devices, weather, seasonality, etc. A predictive engine may use computational intelligence mechanisms (e.g., neural networks, knowledge based artificial intelligence mechanisms, etc.) to proactively adjust the size of the buffer 128 to improve network resource utilization and end user experience.

After predicting the future location and/or path of travel, the processor 124 may determine network conditions for the location/path using "crowdsourced" data stored at an external server (e.g., a "cloud" server) or using crowdsourced data cached at the receiving terminal 120. As described above, the processor 124 may dynamically adjust the size of the buffer 128 based on the network conditions or signal quality of the future location and/or path of travel.

The system 100 of FIG. 1 may provide an enhanced customer experience for two-way communications (including an IR.94 Video Calling Standard and VoLTE) by dynamically reducing dropouts. Dropouts may be dynamically reduced by increasing the size of the buffer 128 in areas resulting in a relatively high end-to-end latency. The system 100 may also reduce (e.g., improve) latency by decreasing the size of the buffer 128 to the extent possible without having a substantial impact on communication quality. For streaming media, the system 100 may reduce dropouts by dynamically adjusting (e.g., increasing) the size of the buffer 128 to store a greater number of encoded data packets when the receiving terminal 120 enters into an area of low (or no) signal coverage or an area associated with higher jitter due to spatial or temporal issues.

According to some implementations, VoLTE may have a requirement that end-to-end packet loss be below a certain threshold. As a non-limiting example, VoLTE may require the end-to-end packet loss to be less than or equal to one percent (although it is to be understood that thresholds other than approximately one percent may be used in alternative examples). The end-to-end packet loss may be dynamically allocated to different transmission chain components of the system 100. As a non-limiting example, ninety percent of the packet loss may be allocated to the Radio Access Network (RAN) components (e.g., a cell site to the terminals 110, 120) and ten percent of the packet loss may be allocated to the core network components (e.g., fiber network components, copper network components, etc.). Thus, if the end-to-end packet loss threshold is one percent (although it is to be understood that thresholds other than approximately one percent may be used in alternative examples), the RAN components may be allocated an end-to-end packet loss of 0.9 percent, and the core network may be allocated an end-to-end packet loss of 0.1 percent. It should be understood that the percentages used herein are for illustrative purposes only and are not to be construed as limiting. In other implementations, the end-to-end packet loss may have a different dynamic allocation across transmission components of the system 100.

If the use case is a mobile-to-mobile (M2M) call, half of the end-to-end packet loss threshold allocated to the RAN components may be allocated to each terminal 110, 120. For example, the transmitting terminal 110 may be allocated an end-to-end packet loss threshold of 0.45 percent, and the receiving terminal 120 may be allocated an end-to-end packet loss threshold of 0.45 percent. The end-to-end packet loss threshold of each terminal 110, 120 may be dynamically adjusted based on conditions at each terminal 110, 120. For example, if the transmitting terminal 110 is in an area with relatively good signal quality and experiences relatively low packet loss, the end-to-end packet loss threshold allocated to the transmitting terminal 110 may be dynamically adjusted (e.g., reduced) and the end-to-end packet loss threshold allocated to the receiving terminal 120 may be increased. To illustrate, the allocated end-to-end packet loss threshold at the transmitting terminal 110 may be reduced to 0.1 percent and the allocated end-to-end packet loss threshold at the receiving terminal 120 may be increased to 0.8 percent. Increasing the allocated end-to-end packet loss threshold at the receiving terminal 120 may enable the size of the buffer 128 to be decreased.

For the M2M call use case, the signal quality of each terminal 110, 120 may be predicted in near real-time to implement the end-to-end packet loss threshold allocation described above. As a non-limiting example, each terminal 110, 120 may predict a signal quality based on historical data indicating a signal quality in a region of the terminals 110, 120.

Additionally, the modulation and FEC coding scheme may be adjusted if one terminal is in an area with a relatively good signal quality and another terminal is an area with a relatively poor signal quality that may cause increased packet loss. To illustrate, if the transmitting terminal 110 is in an area with relatively good signal quality and experiences relatively low packet loss, the transmitting terminal 110 may adjust the modulation and FEC coding scheme used to decode packets such that the transmitting terminal 110 loses a reduced number of packets. As a result, the end-to-end packet loss threshold at the receiving terminal 120 may be increased, which may enable the size of the buffer 128 to be decreased. Other techniques used to reduce packet loss include transmitting duplicate packets in available time slots. In certain implementations, a user specific packet loss algorithm may be used to offset the effects of lost data packets. The user specific packet loss algorithm may be trained based on speech and language usage of a particular user. For example, the user specific packet loss algorithm may access a customized computational intelligence database to "fill in" missing speech that is caused by lost data packets.

Figure 2:
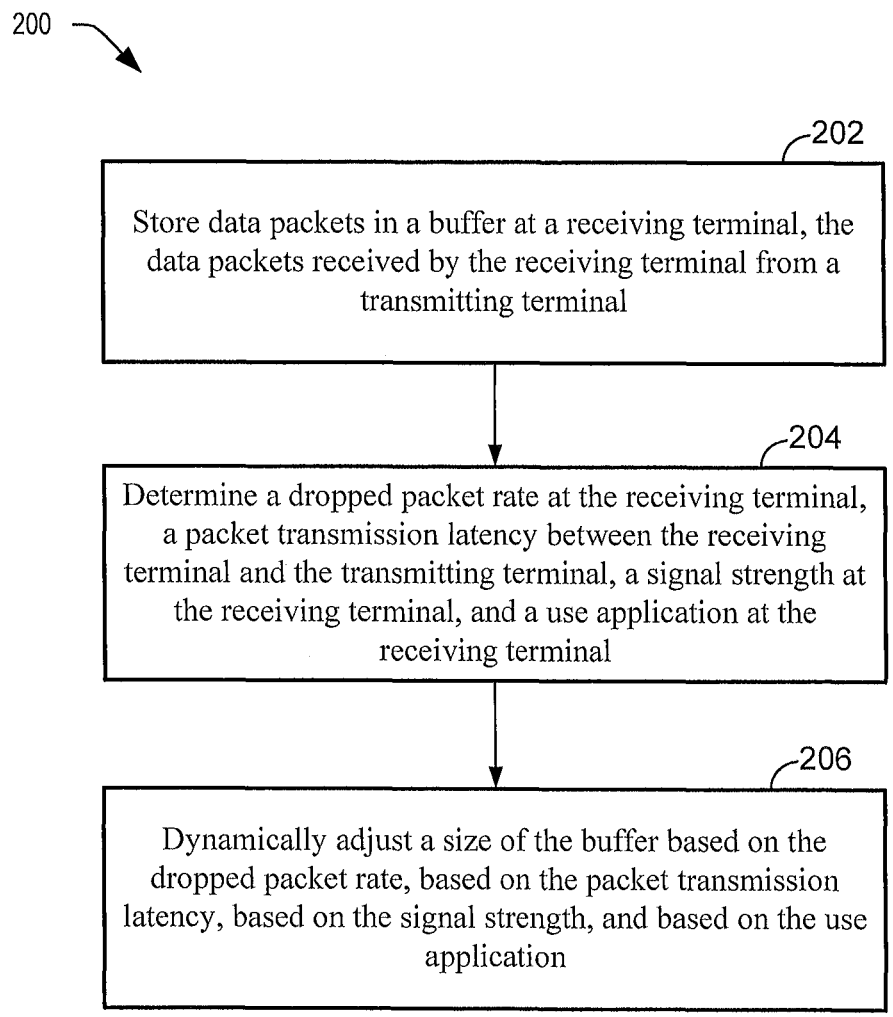
FIG. 2 is a flowchart of a method for dynamically adjusting a size of a jitter buffer.

Referring to FIG. 2, a flowchart of a method 200 for dynamically adjusting a size of a jitter buffer is shown. The method may be performed by the receiving terminal 120 of FIG. 1.

The method 200 includes storing data packets in a buffer at a receiving terminal, at 202. The data packets may be received by the receiving terminal from a transmitting terminal. For example, referring to FIG. 1, the encoded data packets transmitted from the transmitting terminal 110 may be stored at the buffer 128 at the receiving terminal 120.

A dropped packet rate at the receiving terminal, a packet transmission latency between the receiving terminal and the transmitting terminal, a signal quality at the receiving terminal, and a user application at the receiving terminal may be determined, at 204. For example, referring to FIG. 1, the processor 124 may determine a dropped packet rate at the receiving terminal 120. To illustrate, the processor 124 may determine a number of occurrences within a time period that the decoder 127 unsuccessfully attempts to retrieve an encoded data packet from the buffer 128. Additionally, the processor 124 may determine a packet transmission latency between the receiving terminal 120 and the transmitting terminal 110. To illustrate, the processor 124 may determine the packet transmission latency by comparing a time stamp of a particular data packet to a time when the particular data packet is decoded at the decoder 127. The time stamp may indicate when the particular data packet was generated by the packet generator 118. The sensor 129 may determine (e.g., measure) the signal quality at the receiving terminal 120, and the processor 124 may determine the use application at the receiving terminal 120. For example, the processor 124 may determine whether the use application includes a streaming service (e.g., a streaming video service, a streaming audio service, etc.), an interactive call, etc.

A size of the buffer may be dynamically adjusted based on the dropped packet rate, based on the packet transmission latency, based on the signal quality, and based on the use application, at 206. For example, referring to FIG. 1, the processor 124 may increase (e.g., enlarge) the size of the buffer 128 if the dropped packet rate is greater than the dropped packet threshold. The dropped packet threshold may also correspond to a percentage of data packets that are dropped during communication. As a non-limiting example, a commonly quoted requirement for VoLTE is that a packet loss of less than one percent is required (although it is to be understood that thresholds other than approximately one percent may be used in alternative examples). Increasing the size of the buffer 128 may enable additional encoded data packets to be stored at the buffer 128, which in turn, may decrease the likelihood of an unsuccessful attempt (e.g., which may decrease the dropped packet rate). The processor 124 may decrease the size of the buffer 128 if the packet transmission latency is greater than the latency threshold or a dynamic threshold. The dynamic threshold may be based on one or more real-time conditions, near real-time conditions, historical conditions, or predicted conditions. According to one implementation, the processor 124 may dynamically adjust the size of the buffer 128 based on the tradeoff between packet loss and latency.

The processor 124 may further dynamically adjust the size of the buffer 128 based on a signal quality at the receiving terminal 120. To illustrate, the sensor 129 may determine (e.g., measure) the signal quality at the receiving terminal 120. According to one implementation, the signal quality may be compared to the signal quality threshold. The processor 124 may increase the size of the buffer 128 if the signal quality is below the signal quality threshold. For example, if the signal quality is below the signal quality threshold, data packets may arrive out of order due to network conditions. Thus, an increased amount of encoded data packets may need to be stored at the buffer 128 to increase the likelihood that an encoded data packet that arrived out of order is accessible to the decoder 127 when the decoder 127 attempts to retrieve the encoded data packet.

According to one implementation, determining the signal quality according to the method 200 includes predicting a future GPS location of the receiving terminal. For example, referring to FIG. 1, the user of the receiving terminal 120 may input a destination address or the processor 124 may predict a future GPS location based on previous user behavior. To illustrate, the processor 124 may predict the future GPS location based on the time of day and data indicating a GPS location of the receiving terminal 120 at a similar time of day. Determining the signal quality may also include crowdsourcing information from an external server. The information may correspond to a historical signal quality at the future GPS location. Thus, according to one implementation, the signal quality at the receiving terminal 120 may correspond to the historical signal quality at the future GPS location (e.g., the predicted location). The processor 124 may increase the size of the buffer 128 if the historical signal quality at the future GPS location is below a signal quality threshold and if the use application includes a streaming service. For example, if the historical signal quality is below the signal quality threshold, the rate at which the receiving terminal 120 receives data packets may decrease. Thus, in this case, a larger buffer 128 may be used to store a greater number of data packets to enable continuous decoding of data packets when the receiving terminal arrives at the future GPS location.

The processor 124 may further dynamically adjust the size of the buffer 128 based on the use application. For example, the processor 124 may dynamically increase the size of the buffer 128 for interactive calls in anticipation of increased latency. Similarly, the processor 124 may dynamically increase the size of the buffer 128 for streaming files (e.g., streaming video, streaming audio, etc.) if the processor 124 predicts (based on data from the sensor 129) that the receiving terminal 120 will travel through a region with poor signal quality (e.g., poor RF conditions) or predicts that the receiving terminal 120 is subject to cell handover. For example, if the receiving terminal 120 travels through a region of poor signal quality or is subject to cell handover, the rate at which the receiving terminal 120 receives data packets may decrease. Thus, when the receiving terminal 120 enters into the region of poor signal quality (or experiences cell handover), the increased number of data packets (stored in the buffer 128 when the receiving terminal 120 was in the region having the strong signal quality) may be used to enable continuous decoding of data packets during the time period associated with the reduced packet reception rate.

The method 200 of FIG. 2 may provide an enhanced customer experience for two-way communications by dynamically reducing dropouts. Dropouts may be dynamically reduced by increasing the size of the buffer 128 in areas resulting in a relatively high end-to-end jitter. The method 200 may also reduce (e.g., improve) latency by decreasing the size of the buffer 128 to the extent possible without having a substantial impact on communication quality. For streaming media, the system 100 may reduce dropouts by dynamically adjusting (e.g., increasing) the size of the buffer 128 to store a greater number of encoded data packets when the receiving terminal 120 enters into an area of low (or no) signal coverage.

Figure 3:
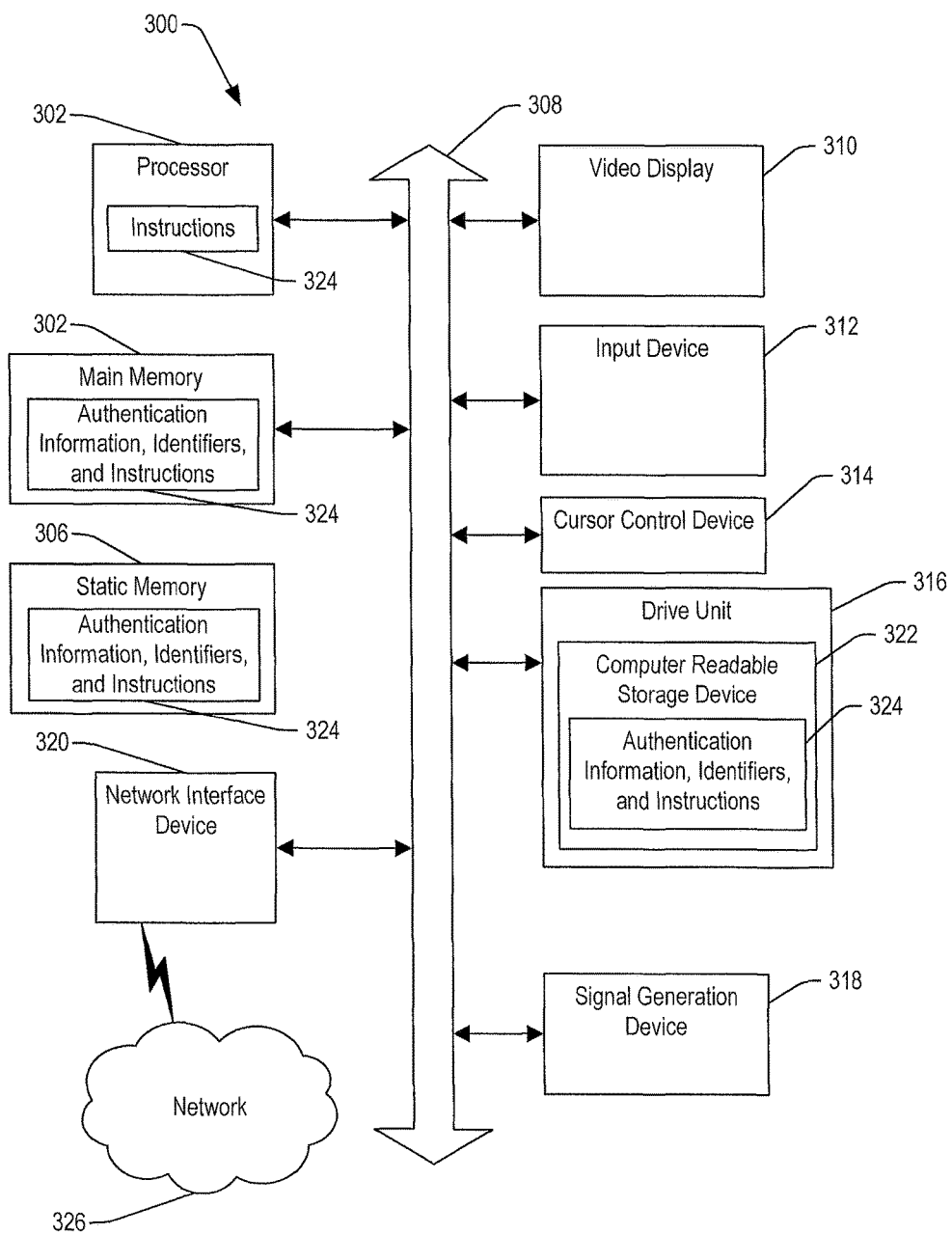
FIG. 3 is a block diagram of a general computer system.

Referring to FIG. 3, a general computer system is shown and is designated 300. The computer system 300 includes a set of instructions (e.g., the instructions 324 in the memory 304) that can be executed to cause the computer system 300 to perform any one or more of the methods or computer based functions disclosed herein. The computer system 300 may operate as a standalone device or may be connected (e.g., using a network) to other computer systems or peripheral devices. For example, the computer system 300 may include or may be included within the transmitting terminal 110 of FIG. 1 or the receiving terminal 120 of FIG. 1.

In a networked deployment, the computer system 300 may operate in the capacity of a server or as a client user computer in a server-client user network environment, or as a peer computer system in a peer-to-peer (or distributed) network environment. The computer system 300 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB) device, a customer premises equipment device, an endpoint device, a web appliance, or any other machine capable of executing a set of instructions (sequential or otherwise) that specify actions to be taken by that machine. In a particular implementation, the computer system 300 may be implemented using electronic devices that provide video, audio, data communication, or combinations thereof. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302 (e.g., a central processing unit (CPU), a graphics processing unit (GPU), or both). For example, the processor 302 may include or correspond to the processor 114 of the transmitting terminal 110 of FIG. 1 or the processor 124 of the receiving terminal 120 of FIG. 1. Moreover, the computer system 300 may include a main memory 304 and a static memory 306, which can communicate with each other via a bus 308. For example, the main memory 304 may include or correspond to the memory 112 of the transmitting terminal of FIG. 1 or the memory 122 of the receiving terminal 120 of FIG. 1. As shown, the computer system 300 may further include a video display unit 310, such as a liquid crystal display (LCD), a light emitting diode (LED) display, a touch screen display, a flat panel display, a solid state display, or a lamp assembly of a projection system. Additionally, the computer system 300 may include an input device 312, such as a remote control device (e.g., a television remote or a set-top box remote), a keyboard, a joystick, another type of input device, or combinations thereof. In addition, the computer system 300 may include a cursor control device 314 (e.g., a mouse). In some implementations, the input device 312 and the cursor control device 314 may be integrated into a single device, such as a capacitive touch screen input device. The computer system 300 may also include a drive unit 316, a signal generation device 318, such as a speaker or remote control, and a network interface device 320. Some computer systems 300 may not include an input device (e.g., a server may not include an input device).

In a particular, implementation, as depicted in FIG. 3, the drive unit 316 may include a computer-readable storage device 322 in which authentication information, identifiers, and one or more sets of instructions 324, e.g. software, can be embedded. The computer-readable storage device 322 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 324 may embody one or more of the methods or logic as described herein. The instructions 324 may be executable by the processor 302 to perform one or more functions or methods described herein, such as the method 200 described with reference to FIG. 2. In a particular implementation, the authentication information, identifiers, and instructions 324 may reside completely, or at least partially, within the main memory 304, the static memory 306, and/or within the processor 302 during execution by the computer system 300. The main memory 304 and the processor 302 also may include a computer-readable storage device. The authentication information included in the authentication information, identifiers, and instructions 324 in the drive unit 316, the main memory 304, the static memory 306, the processor 302, or combinations thereof may be transmitted to another computer system to enable authentication of the computer system 300, and the identifiers may include a list of identifiers used to authenticate the other computer system, prior to sharing a resource with the other computer system.

In an alternative implementation, dedicated hardware implementations, such as application specific integrated circuits, programmable logic arrays and other hardware devices, may be constructed to implement one or more of the methods described herein. Various implementations may include a variety of electronic and computer systems. One or more implementations described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various implementations of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting implementation, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 300 may communicate with one or more external systems via a network 326. First data stored by the computer-readable storage device 322 may be sent to the one or more external systems via the network 326. Also, second data may be received by the computer system 300 via the network 326. The second data may be stored by the processor 324 to the computer-readable storage device. Additionally, while the computer-readable storage device 322 is shown to be a single device, the computer-readable storage device 322 may be a single device or may be multiple devices, such as a centralized or distributed database, and/or associated caches and servers that store one or more sets of instructions. The computer-readable storage device 322 is capable of storing a set of instructions for execution by the processor 302 to cause the computer system 300 to perform any one or more of the methods or operations disclosed herein.

In a particular non-limiting, exemplary implementation, the computer-readable storage device 322 may include a solid-state memory such as embedded memory (or a memory card or other package that houses one or more non-volatile read-only memories). Further, the computer-readable storage device 322 may include a random access memory or other volatile re-writable memory. Additionally, the computer-readable storage device 322 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 300 in selected implementations.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations.

Less than all of the steps or functions described with respect to the exemplary processes or methods can also be performed in one or more of the exemplary implementations. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary implementations can facilitate one or more functions, where the facilitating (e.g., facilitating access or facilitating establishing a connection) can include less than every step needed to perform the function or can include all of the steps needed to perform the function.

In one or more implementations, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more implementations, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other implementations, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
dynamically adjusting a size of a buffer of a receiving terminal based on a comparison of a signal quality metric associated with a wireless communication channel between the receiving terminal and a transmitting terminal to a signal quality threshold;
storing a first set of data packets of a plurality of data packets in the buffer, the first set of data packets received at the receiving terminal from the transmitting terminal; and
outputting reconstructed speech based on the first set of data packets and replacement packets that are generated based at least in part on the first set of data packets and a user specific packet loss algorithm, wherein the replacement packets are associated with a set of unreceived data packets of the plurality of data packets, and wherein the user specific packet loss algorithm is trained based on speech samples associated with a particular user.

2. The method of claim 1, further comprising receiving a message indicating the signal quality metric from the transmitting terminal and the receiving terminal, wherein the signal quality metric corresponds to a measured signal quality metric at the transmitting terminal.

3. The method of claim 1, further comprising measuring the signal quality metric at the receiving terminal.

4. The method of claim 1, wherein the size of the buffer is dynamically adjusted based further on a comparison of a dropped packet rate at the receiving terminal to a dropped packet threshold, and wherein the set of unreceived data packets comprises a set of dropped data packets of the plurality of data packets.

5. The method of claim 4, further comprising determining the dropped packet rate at the receiving terminal, wherein the size of the buffer is increased in response to the dropped packet rate being greater than the dropped packet threshold.

6. The method of claim 1, further comprising dynamically adjusting the size of the buffer based on a second signal quality metric associated with a predicted future location of the receiving terminal, the predicted future location based on an input indicating a destination of the receiving terminal.

7. The method of claim 6, further comprising receiving, from an external server, data corresponding to a historical signal quality metric associated with the predicted future location, wherein the second signal quality metric comprises the historical signal quality metric.

8. The method of claim 7, wherein the data comprises crowdsourced data stored at the external server.

9. An apparatus comprising:
a transceiver configured to receive a first set of data packets of a plurality of data packets from a transmitting terminal;
a buffer configured to store data packets;
a processor; and
a memory comprising instructions executable by the processor to perform operations comprising:
dynamically adjusting a size of the buffer based on a comparison of a signal quality metric associated with a wireless communication channel between the transceiver and the transmitting terminal to a signal quality threshold;
storing the first set of data packets at the buffer; and
initiating output of reconstructed speech based on the first set of data packets and replacement packets that are generated based at least in part on the first set of data packets and a user specific packet loss algorithm, wherein the replacement packets are associated with a set of dropped data packets of the plurality of data packets, and wherein the user specific packet loss algorithm is trained based on speech samples associated with a particular user.

10. The apparatus of claim 9, further comprising a sensor configured to measure the signal quality metric.

11. The apparatus of claim 9, wherein the transceiver is further configured to receive a message indicating the signal quality metric from the transmitting terminal, wherein the signal quality metric comprises a measured signal quality metric at the transmitting terminal.

12. The apparatus of claim 9, wherein the operations further comprise dynamically adjusting the size of the buffer by increasing the size of the buffer in response to the signal quality metric being less than or equal to the signal quality threshold.

13. The apparatus of claim 9, wherein the operations further comprise decreasing the size of the buffer in response to the signal quality metric being greater than the signal quality threshold.

14. A computer-readable storage device comprising instructions that, when executed by a processor, cause the processor to perform operations comprising:
dynamically adjusting a size of a buffer of a receiving terminal based on a comparison of a signal quality metric associated with a wireless communication channel between the receiving terminal and a transmitting terminal being to a quality threshold;
storing a first set of data packets of a plurality of data packets in the buffer, the first set of data packets received at the receiving terminal from the transmitting terminal; and
initiating output of reconstructed speech based on the first set of data packets and replacement packets that are generated based at least in part on the first set of data packets and a user specific packet loss algorithm, wherein the replacement packets are associated with a set of unreceived data packets of the plurality of data packets, and wherein the user specific packet loss algorithm is trained based on speech samples associated with a particular user.

15. The computer-readable storage device of claim 14, wherein the operations further comprise storing a third set of data packets in the buffer after further adjusting the size of the buffer based on a second signal quality metric, wherein a first number of data packets of the first set of data packets is different from a second number of data packets of the third set of data packets.

16. The computer-readable storage device of claim 14, wherein the operations further comprise dynamically adjusting the size of the buffer based further on a comparison of a latency threshold and a packet transmission latency between the transmitting terminal and the receiving terminal.

17. The computer-readable storage device of claim 14, wherein the operations further comprise dynamically adjusting the size of the buffer based further on a use application at the receiving terminal, wherein the use application comprises a video streaming service, an audio streaming service, or an interactive call.

* * * * *